Dec. 11, 1962   J. F. CONNORS   3,067,573
TELESCOPING-SPIKE SUPERSONIC INLET FOR AIRCRAFT ENGINES
Filed Feb. 27, 1958

INVENTOR.
JAMES F. CONNORS
BY
ATTORNEYS

United States Patent Office 3,067,573
Patented Dec. 11, 1962

1

3,067,573
TELESCOPING-SPIKE SUPERSONIC INLET FOR AIRCRAFT ENGINES
James F. Connors, North Olmsted, Ohio, assignor, by mesne assignments, to the United States of America as represented by the Administrator of the National Aeronautics and Space Administration
Filed Feb. 27, 1958, Ser. No. 718,095
7 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The present invention relates to air inlets for aircraft engines and particularly to supersonic inlets for turbojet or ram-jet engines that operate over a wide range of Mach numbers.

The early designs for jet engines provided a circular opening for inducting air that was utilized for combustion. As the speeds of aircrafts increased and exceeded the speed of sound (Mach 1), it was found that there were increasingly severe performance losses associated with the use of simple divergent ducts, or normal-shock inlets. In order to maintain high efficiency levels at supersonic speeds, an axisymmetric inlet, which utilizes a centerbody with contoured surfaces to produce isentropic compression ahead of the terminal shock, has been employed. Normally these compression nozzles are of a fixed geometry design and are sized for the highest Mach number condition that the engine will be subjected to during flight. However, at reduced speeds there is high spillage drags and consequently poor "off-design" performance.

The present invention overcomes the deficiency of a fixed geometry inlet by having a telescoping compression surface and a subsonic dump. The telescoping compression surface approximates the "on-design" isentropic compression surface contour at each Mach number. Any attendant surface discontinuities are accommodated by boundary-layer separation and bridging to form, in effect, a smooth aerodynamic surface.

It is therefore a principal object of the present invention to provide an inlet for an aircraft engine that will achieve high diffuser efficiencies over a large range of Mach numbers while maintaining essentially zero cowl drag.

Another object of the present invention is to provide a compression nozzle that will approximate the theoretical contour required for isentropic compression over a wide range of Mach numbers.

A further object of the present invention is to provide a subsonic dump or abrupt area discontinuity downstream of the throat where the normal shock would be located.

Still another object of the present invention is to provide an inlet having a variable throat area in accordance with the different air speeds of the aircraft.

Other objects and many of the attendant advantages of this invention will be readily appreciated as the same becomes better understood by reference to the following detailed description when considered in connection with the accompanying drawing wherein.

Figure 1:
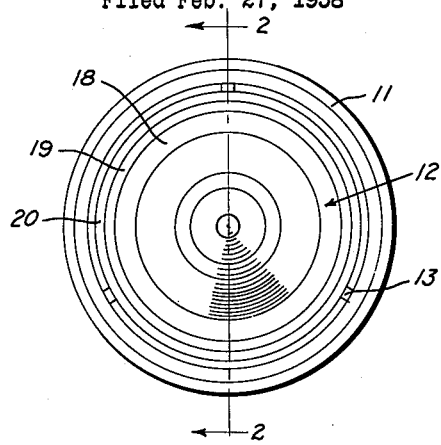
FIG. 1 is a front elevation showing an inlet having a telescopic spike.
Figure 2:
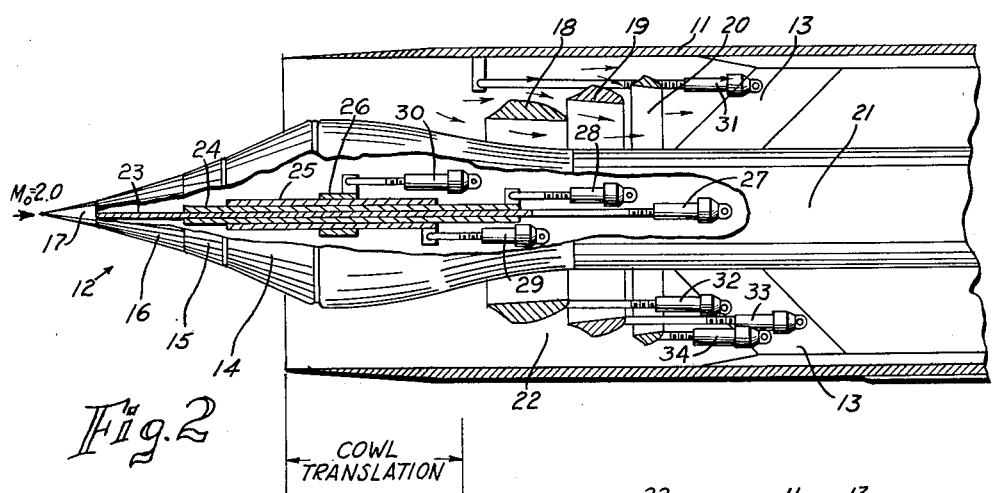
FIG. 2 is a sectional view taken along line 2—2 of FIG. 1.

Referring now to FIGS. 1 and 2 of the drawing, there is shown an inlet for a turbojet or ram-jet engine having an axially movable cowl 11 and a compression spike 12 mounted concentrically within by means of struts 13.

2

The compression spike 12 has tapered sections 14, 15, 16, and 17 that telescope one into another to form a conical contoured surface. A plurality of annular deflection rings 18, 19, and 20 are slidably mounted within the cowl 11 and are axially positionable around the compression spike 12.

The four tapered sections 14 to 17, inclusive, when in the retracted position, as shown in FIG. 2 of the drawing, provide a conical contour with the apex directed toward the direction of travel of the engine. This conical contour is slightly concave and tapers toward a position of maximum diameter, then in a reverse taper rearwardly, and then blends into a straight shaft portion 21. Each of the sections 14 to 17, inclusive, has a tapering portion and a cylindrical portion. The tapering portion on the leading section 17 is conical and the cylindrical portion is axially slidable into the tapering portion of the adjacent section 16. The tapering portions of sections 16, 15, and 14 are frustums of cones and each cylindrical portion telescopes into the adjacent tapering portion of the next section. The rearwardmost section 14 telescopes into the stationary portion of the compression spike.

The first annular deflection ring 18 has an inside diameter approximately equal to the maximum diameter of the compression spike 12. Also the inside diameter of the forward edge of deflection ring 19 is approximately equal to the maximum diameter of deflection ring 18, and the inside diameter of the forward edge of deflection ring 20 is approximately equal to the maximum diameter of deflection ring 19.

By way of example, the configuration shown in FIG. 2 of the drawing might represent an "on-design" condition for Mach 2, with the three rings 18, 19, and 20 being retracted and locked in the subsonic diffuser section 22. The cowl 11 is in an extended position to match the focal point of the compression waves.

Figure 3:
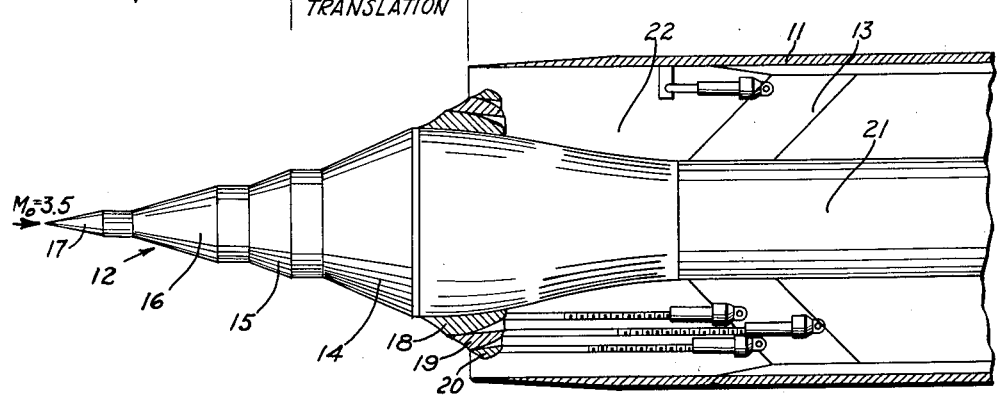
FIG. 3 is a sectional view similar to the sectional view shown in FIG. 2, but showing the telescopic spike extended.

In FIG. 3 of the drawing, there is an illustration depicting the configuration of the inlet at a speed of Mach 3.5. The three annular rings 18, 19, and 20, have been extended to their respective forward positions and the throat area of the inlet has been considerably reduced thereby reducing the flow of air between the compression spike and the cowl 11. Tapered sections 15, 16, and 17, have been extended and the cowl 11 has been retracted to match the movement of the focal point of the compression waves. Movement of the annular rings 18, 19, and 20 to their forward positions provides a subsonic dump in the diffuser section 22. This subsonic dump is simply an abrupt area discontinuity downstream of the throat where the normal shock would be located and is characterized by a low subsonic dynamic head.

The movements of the annular rings, the telescoping sections of the compression spike 12, and the cowl 11 can be accomplished in a number of ways such as by the use of cam-positioners, variable pitch screws or by pneumatic or hydraulic systems. The use of pneumatic or hydraulic systems for moving or positioning components on airplanes are well known to those skilled in the art. By way of example, one method of moving the telescoping sections, the cowl, and the rings is shown in FIG. 2 of the drawing. Push-rods 23 to 26, inclusive, are shown attached to the telescoping sections, and these rods are connected to jackscrews 27 to 30, respectively. The jackscrews can be of any conventional design, well known to those skilled in the art, and can be operated by any well-known means, such as a gear train or the like. A jackscrew 31 is also shown attached to the strut 13 for translating the cowl 11, and three jackscrews 32 to 34, inclusive, are shown for operating, respectively, the rings 18, 19, and 20.

During operation of the engine at a speed of Mach 2 or lower, the compression spike and annular rings will assume the configuration shown in FIG. 2 of the drawing. As the speed of the engine progressively increases between Mach 2 and Mach 3.5 the tapered sections of the compression spike will be gradually extended and the annular rings 18—20 will move forward thus reducing the area of the nozzle inlet. At Mach 3.5, the inlet nozzle will assume the position shown in FIG. 3 of the drawing. As the compression spike 12 is extended by outward movement of the tapered sections 15, 16, and 17, the focal point of the compression waves moves rearwardly, and consequently in order to compensate for this movement the cowl 11 is translated a distance equal to the distance of travel of the focal point. In actual practice the movement of the annular rings, the extension of the compression spike and the translation of the cowl 11 can be programmed for any condition of engine speed between Mach 2 and Mach 3.5 and the various components can be positioned simultaneously and automatically.

It can thus be seen that the present invention provides a compression spike that can approximate the theoretical contour required for isentropic compression for speeds at various Mach numbers. Thus high diffuser efficiencies are obtained over a large range of Mach numbers while still maintaining the cowl drag to a minimum.

Obviously many modifications and variations of the present invention are possible in the light of the above teachings. It is therefore to be understood that the invention may be practiced otherwise than as specifically described.

What is claimed is:

1. A compression spike for a jet engine comprising: a body having a stationary portion and a movable portion, said movable portion being comprised of a plurality of telescoping tapered rigid sections, each section being slidable axially into an adjacent section with the rearward most section being slidable axially into said stationary portion thereby providing an aerodynamic surface adapted for deflecting air at progressively increasing angles and means for axially moving said tapered sections relative to said stationary portion.

2. A supersonic inlet for a high speed jet engine comprising: an axially movable cowl; a compression spike mounted within said cowl and having a plurality of telescoping tapered sections extending beyond the opening of said cowl, means interposed between said compression spoke and said cowl for regulating the flow of air therebetween, and separate means for axially moving said cowl and said telescoping tapered sections.

3. A supersonic inlet for a high speed engine comprising: an axially movable cowl, a compression spike concentrically mounted within said cowl and having a plurality of telescoping tapered sections extending beyond the lip of said cowl, a plurality of deflection rings interposed between said cowl and said compression spike for regulating the flow of air therebetween, and separate means for axially moving said cowl, said telescoping tapered sections and said plurality of deflection rings.

4. A compression spike for a jet engine comprising: a body having a stationary portion and a movable portion, said movable portion being comprised of a plurality of sections, each section having a cylindrical portion and a tapering portion, each section being slidable axially into an adjacent section with the rearward most section being slidable axially into said stationary portion thereby providing a surface adapted for deflecting air at progressively increasing angles, and means for axially moving said tapered sections relative to said stationary portion.

5. An inlet for a high speed engine comprising: a cowl; a compression spike having a stationary portion and a movable portion, said movable portion being comprised of a plurality of sections each having a cylindrical portion and a tapering portion, each section being slidable axially into an adjacent section with the rearward most section being slidable axially into said stationary portion thereby providing a surface adapted for deflecting air at progressively increasing angles; means for regulating the flow of air between said cowl and said compression spike; and means for axially moving said tapered sections of said compression spike.

6. An inlet for a high speed engine comprising: an axially movable cowl; a compression spike having a stationary portion and a movable portion, said movable portion being comprised of a plurality of sections each having a cylindrical portion and a tapering portion, each section being slidable axially into an adjacent section with the rearward most section being slidable axially into said stationary portion thereby providing a surface adapted for deflecting air at progressively increasing angles; a plurality of deflection rings interposed between said cowl and said compression spike for regulating the flow of air therebetween; and means for axially moving said cowl, said plurality of sections of said compression spike and said plurality of deflection rings.

7. An inlet for a high speed engine comprising: an axially movable cowl; a compression spike having a stationary portion and a movable portion, said movable portion being comprised of a plurality of telescoping tapered sections, each section being slidable axially into an adjacent section to provide a surface adapted for deflecting air at progressively increasing angles; a plurality of deflection rings interposed between said cowl and said compression spike for regulating the flow of air therebetween; and means for axially moving said cowl, said plurality of sections of said compression spike and said plurality of deflection rings.

References Cited in the file of this patent

UNITED STATES PATENTS

| | | |
|---|---|---|
| 2,638,738 | Salter | May 19, 1953 |
| 2,763,426 | Erwin | Sept. 18, 1956 |

FOREIGN PATENTS

| | | |
|---|---|---|
| 1,147,191 | France | June 3, 1957 |
| (Corresponding British Patent 799,504 Aug. 13, 1958) | | |
| 607,686 | Great Britain | Sept. 3, 1948 |
| 747,705 | Great Britain | Apr. 11, 1956 |
| 761,235 | Great Britain | Nov. 14, 1956 |